June 19, 1934.  B. W. TWYMAN  1,963,927
DRAG LINK
Filed March 14, 1932
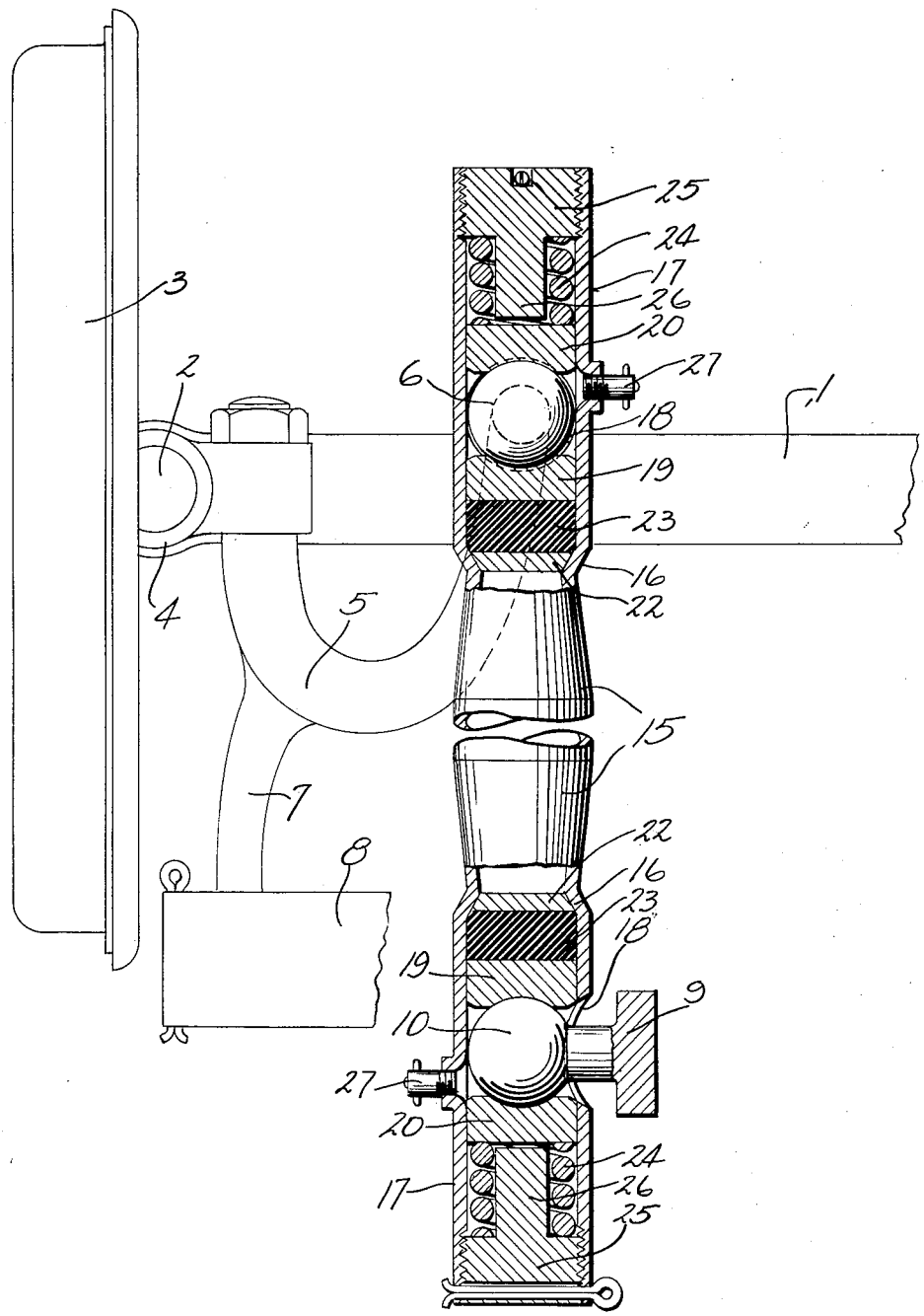

Patented June 19, 1934

1,963,927

UNITED STATES PATENT OFFICE 1,963,927

DRAG LINK

B. Wickliffe Twyman, Indianapolis, Ind., assignor to Hannum Manufacturing Company, Milwaukee, Wis., a corporation of Wisconsin Application March 14, 1932, Serial No. 598,690

4 Claims. (Cl. 74—17)

This invention relates to improvements in drag links, and has particular reference to the drag link used in a motor vehicle between the steering gear arm and the arm connected with a dirigible vehicle wheel.

Drag links have long been equipped with springs for taking up wear between the bearing element of the link and the ball attached to the arm to which the link is connected. Such springs have not, however, been recognized as performing any shock absorbing function and, in fact, have customarily been used in drag link designs such that both springs exerted their pressure in the same direction, thereby shortening the drag link to some slight extent.

Experiments with steering gears and with drag links of the aforesaid design have proven that there is a distinct detrimental effect on the steering gear due to the transmission to the worm or screw of the gear of road shocks occasioned by obstacles encountered by the wheels.

It is therefore an important object of the present invention to provide a drag link with means cushioning the steering gear from road shock, thereby not only relieving the gear itself, but also greatly facilitating the driving of the vehicle and relieving the operator.

The drawing shows a drag link partially in plan and partially in axial section applied to automotive parts in a conventional manner, the construction of the drag link embodying the present invention.

At 1, I have illustrated the conventional front axle provided with a steering pin at 2 upon which the wheel 3 is dirigible. Connected with the hub portion 4 of the steering axle is the usual arm 5 which carries an upwardly projecting ball at 6 to receive motion from the drag link. A branch 7 of arm 5 is connected with another link at 8 extending in the usual way to the other vehicle wheel (not illustrated).

At 9, I have shown, in section, the end portion of the usual depending steering gear arm which oscillates to control the position of the steering wheels. This arm carries a laterally projecting spherical head 10 engaged by the drag link hereinafter to be described.

The drag link embodying this invention is preferably of a generally tubular form, having a body portion 15 tapering to shoulders at 16 beyond which the cross section of the tube is again enlarged to provide cylindrical terminal sockets 17 at each end of the link. Each of the terminal sockets 17 has the usual opening at 18 through which the corresponding sphere 6 or 10 is receivable.

Each of the spheres 6 and 10 is engaged by spherically concave bearing elements 19 and 20, which have a piston-like fit in their respective terminal sockets of the drag link and are axially reciprocable therein.

In accordance with this invention each of the bearing elements is resiliently cushioned. Abutment washers 22 fitted against shoulder 16 of the body portion of the drag link support resilient cushions 23 of rubber or the like, which fill the diameter of the socket substantially completely and are therefore only slightly compressible. It is necessary to limit the degree of yielding movement permitted to the bearing elements in order that these elements may, under no circumstances, release their interlocking engagement with the spherical heads 6 and 10.

Each of the bearing elements 20 is engaged by a compression spring at 24 which, in the present device, not merely serves to take up wear between the balls 6 and 10 and their respective socket bearing elements, but also to cushion the bearing elements 20. The spring seats against a threaded plug 25 which has an axial extension at 26 limiting the yielding movement of the spring for the purposes aforesaid. Each plug is pinned to the drag link as shown and in accordance with usual practice. Means is preferably provided through fittings 27 for the pressure lubrication of the spherical heads and their respective bearing elements.

It will be observed that the drag link herein disclosed is completely floated from both of the parts to which it is connected, in the sense that it is resiliently yieldable to a slight degree not only with respect to the steering arm 5, but also with respect to the gear arm 9. Any shock originating in either of these elements and acting in either direction upon the drag link is twice dampened by the resilient cushioning means before it can pass from the link.

It is particularly to be noted also, that the drag link design herein disclosed ensures that any such shock will have to traverse at least one of the rubber cushions 23, since such cushions are positioned to act in opposite directions. The different characteristics of a rubber cushion and a metal spring provide a more satisfactory assurance of damping out undesired shocks and vibrations than could be had where such shocks or vibrations were caused to traverse only springs or only cushions.

I claim:

1. In a drag link, the combination with a link member, of a pair of spaced bearing elements yieldable with respect to each other upon said member, a rubber cushion supporting one of said elements against yielding movement, and a spring supporting the other of said elements against yielding movement in an opposite direction.

2. In a drag link, a tubular body member reduced in cross section to provide a seat and provided therebeyond with a terminal socket, in combination with an abutment fitted to said seat, an elastic composition cushion on said abutment, a bearing element reciprocable in the socket and supported by the cushion for limited yielding movement, an opposed bearing element reciprocable in said socket, a spring acting on said opposed bearing element, and a spring abutment including means positively limiting the yielding of said opposed element.

3. In a drag link, the combination with a link member, of pairs of bearing elements yieldably mounted at each end of said member, spring means resiliently opposing the yielding movement of corresponding elements at the respective ends of said member, and rubber cushioning means resiliently opposing the yielding movement of the other elements at the respective ends of said member.

4. In a drag link, the combination with a tubular link member having a body portion tapering to a reduced diameter to provide annular shoulders and thence extended cylindrically to provide sockets laterally apertured for the reception of a spherical bearing head, of abutments seated against the respective shoulders, rubber cushions substantially filling the diameter of said sockets and seated against the respective abutments, concave bearing elements reciprocable in the respective sockets and supported by said rubber cushions, opposed concave bearing elements reciprocably mounted in the socket in spaced relation to said first mentioned elements for the reception of heads inserted through said apertures, springs yieldably supporting said second bearing elements, and plugs providing spring seats closing said sockets and including means for positively limiting the yielding movement of said second elements.

B. WICKLIFFE TWYMAN.